United States Patent
Redjaian et al.

(10) Patent No.: US 7,685,263 B2
(45) Date of Patent: Mar. 23, 2010

(54) METHOD AND SYSTEM FOR CONFIGURING A DEVICE WITH A WIRELESS MOBILE CONFIGURATOR

(75) Inventors: Tim Redjaian, Menlo Park, CA (US); Thomas J. Kelly, Fergus (CA); Kyle Brown, Pleasantan, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 640 days.

(21) Appl. No.: 11/613,103

(22) Filed: Dec. 19, 2006

(65) Prior Publication Data

US 2008/0147831 A1 Jun. 19, 2008

(51) Int. Cl.
G06F 15/177 (2006.01)
H04K 1/00 (2006.01)
(52) U.S. Cl. ......................... 709/220; 709/222; 380/255
(58) Field of Classification Search ................. 709/220, 709/222; 380/255
See application file for complete search history.

(56) References Cited

U.S. PATENT DOCUMENTS

| 6,035,401 | A | * | 3/2000 | Dalvi et al. ................. 714/746 |
| 7,152,110 | B2 | * | 12/2006 | Pierce ........................ 709/227 |
| 2005/0198233 | A1 | * | 9/2005 | Manchester et al. ......... 709/221 |
| 2007/0123166 | A1 | * | 5/2007 | Sheynman et al. .......... 455/41.2 |
| 2007/0268514 | A1 | * | 11/2007 | Zeldin et al. ............... 358/1.15 |

* cited by examiner

*Primary Examiner*—Larry Donaghue
*Assistant Examiner*—Brian J Gillis
(74) *Attorney, Agent, or Firm*—Sonnenschein Nath & Rosenthal LLP

(57) ABSTRACT

Consistent with one embodiment of the invention, a wireless mobile device is configured to receive a configuration file from a configuration server. After receiving the configuration file, the wireless mobile device establishes a wireless communication session with a computing device within proximity of the mobile device. The mobile device is configured to send the configuration file to the computing device so as to enable a configuration application executing on the computing device to configure the computing device in accordance with configuration information included in the configuration file.

15 Claims, 5 Drawing Sheets

METHOD AND SYSTEM FOR CONFIGURING A DEVICE WITH A WIRELESS MOBILE CONFIGURATOR

FIELD OF THE INVENTION

The invention relates to methods and systems for securely configuring computing devices with the aid of a wireless mobile device.

BACKGROUND

Setting up a new computing device to work in an existing computer network environment can be difficult for a variety of reasons. First, the computing device that requires configuring needs to have, or be connected to, some sort of input device (e.g., keyboard and/or pointing device) and user interface (e.g., display or monitor) so as to allow an administrator to input and view configuration information. This requirement does not usually pose a problem for certain computing devices, such as personal computers and workstations, as they are designed to operate under normal circumstances with a connected keyboard and display. However, a wide variety of application specific computing devices are designed to operate without conveniently located input devices and user interfaces.

For example, some servers, network-connected appliances, embedded computer systems, and mobile or handheld devices may not be equipped with input devices and/or user interfaces (e.g., displays) suitable for set up and configuration. Often these devices are configured by establishing a terminal session by means of a serial connection to the device's serial port, and then issuing configuration commands at a command line interface. This method of configuration is less than ideal. If multiple devices need to be configured, a serial connection must be established with each device, thereby requiring the plugging in and unplugging of the serial cable. It is often the case that a device is inconveniently located (e.g., in a server room) where it can be difficult to access. Even when the device itself is accessible, the device's serial port may be inconveniently located on the device. In the case that a device does have an input mechanism and/or display, typically the input mechanism is limited to a few buttons and the display is small. Regardless of whether the device includes an input mechanism, entering configuration commands and/or information can be tedious, repetitive, and susceptible to human errors. Even in a best case scenario, when a device has a suitable input mechanism and user interface, extensive knowledge of application and network configuration parameters is generally required in order to properly configure a device. Often the configuration settings for a new device are dependent upon the configuration settings of one or more existing devices. Consequently, configuring a new device may require querying one or more other devices for configuration settings. Accordingly, an improved configuration method and system are desirable.

SUMMARY

Consistent with one embodiment of the invention, a wireless mobile device is configured to receive a configuration file from a configuration server. After receiving the configuration file, the wireless mobile device establishes a wireless communication session with a computing device within proximity of the mobile device. The mobile device is configured to send the configuration file to the computing device so as to enable a configuration application executing on the computing device to configure the computing device in accordance with configuration information included in the configuration file.

Consistent with another aspect of the invention, the wireless mobile device receives several configuration files for configuring several computing devices. Each configuration file is associated with a unique computing device identifier, for example, such as a device serial number, or the Media Access Control (MAC) address of a computing device's network interface card (NIC). When the wireless mobile device establishes a wireless communication session with a particular computing device, the computing device sends the wireless mobile device its unique computing device identifier (e.g., serial number). Accordingly, the wireless mobile device selects a configuration file corresponding to the unique computing device identifier to send to the computing device.

Furthermore, one embodiment of the invention includes a variety of security measures. For instance, in one embodiment, the configuration server digitally signs configuration files at the configuration server with a private key of the configuration server. Upon receiving a configuration file from a wireless mobile device, a computing device uses a public key of the configuration server to validate the digital signature associated with the configuration file. In addition, the configuration server encrypts the configuration file at the configuration server with a public key of a computing device. Accordingly, after the wireless mobile device sends the encrypted configuration file to the computing device, the computing device uses a private key of the computing device to decrypt the configuration file. Other aspects of the invention are described below in connection with the description of the figures.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

Figure 1B:
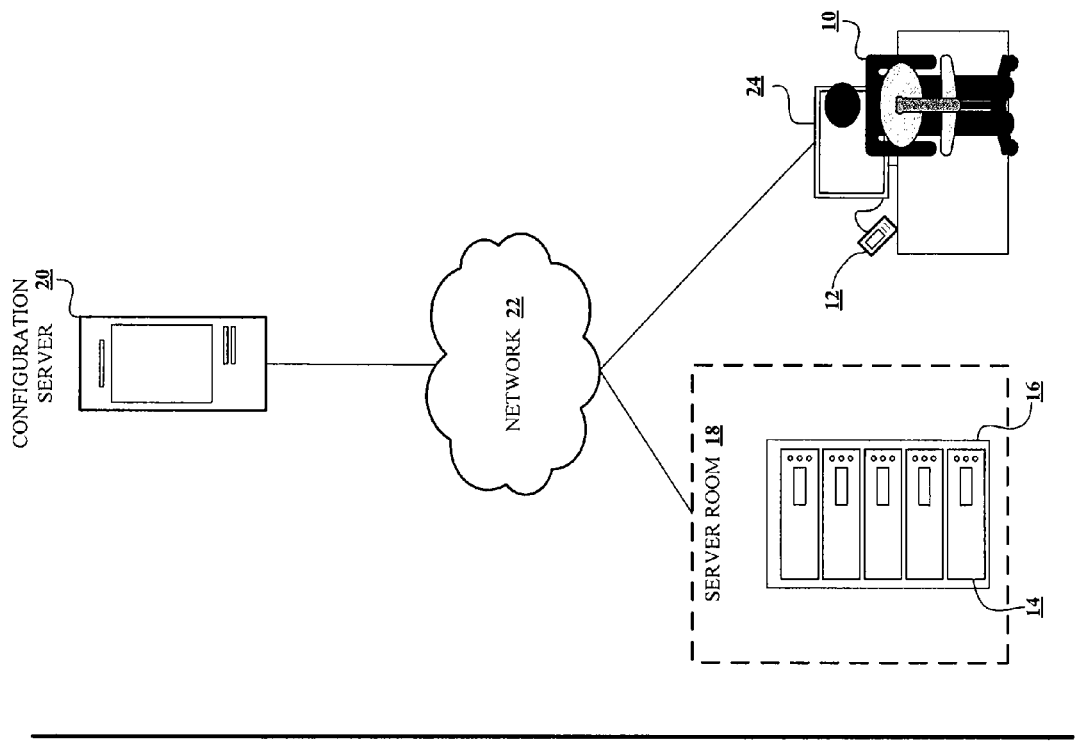
FIGS. 1A and 1B illustrate examples of computing environments in which an embodiment of the invention may be used.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Consistent with one embodiment of the invention, a mobile device is used to automatically and securely configure a computing device within proximity of the mobile device. In general, configuring a computing device is achieved in two steps. First, an administrator uses the mobile device to establish a connection with a configuration server, which generates a configuration file that is communicated to the mobile device. Next, after the configuration file has been communicated to the mobile device, the mobile device is used to create a wireless connection to a target computing device and to initiate a configuration process on the target computing device. As part of the configuration process, the configuration file is transferred from the mobile device to the target computing device. Accordingly, a configuration application executing on the target computing device extracts configuration information from the configuration file and utilizes the configuration information to configure itself.

In one embodiment of the invention, several security measures are in place to assure that each computing device to be configured is protected against unauthorized access and improper configuration. For example, according to one embodiment of the invention, each computing device that is to be configured is assigned a unique computing device identifier (e.g., serial number, or MAC address, or a portion thereof). Furthermore, the unique computing device identifier assigned to each computing device is provided to a configuration server. Accordingly, when the configuration server generates a configuration file for a particular target computing device, the configuration server associates the configuration file with the target computing device's unique computing device identifier. The mobile device is configured to validate a target computing device's unique computing device identifier before sending a configuration file to the target computing device.

In addition, a system of asymmetric cryptography is used for authentication and encryption purposes. For example, in one embodiment of the invention, public key digital signatures are used to authenticate the source of a configuration file. Accordingly, after the configuration server generates a configuration file, the configuration server digitally signs the configuration file with a private key of the configuration server. When a target computing device receives a configuration file from the mobile device, the target computing device uses a public key associated with the configuration server's private key to authenticate the configuration file. It will be appreciated by those skilled in the art that a digital signature may be generated in a variety of well-known and conventional manners, to include hash generating routines. Similarly, in one embodiment of the invention, public key encryption may be used to prevent unauthorized access to the configuration file. After the configuration server generates the configuration file, the configuration server encrypts the configuration file with a public key of the target computing device. Accordingly, the target computing device uses its own private key to decrypt the configuration file. This ensures that only the target computing device, which has access to its own private key, is capable of decrypting a configuration file generated specifically for the target computing device. Other aspects of the invention are described in greater detail below in connection with the description of the figures.

Figure 1A:
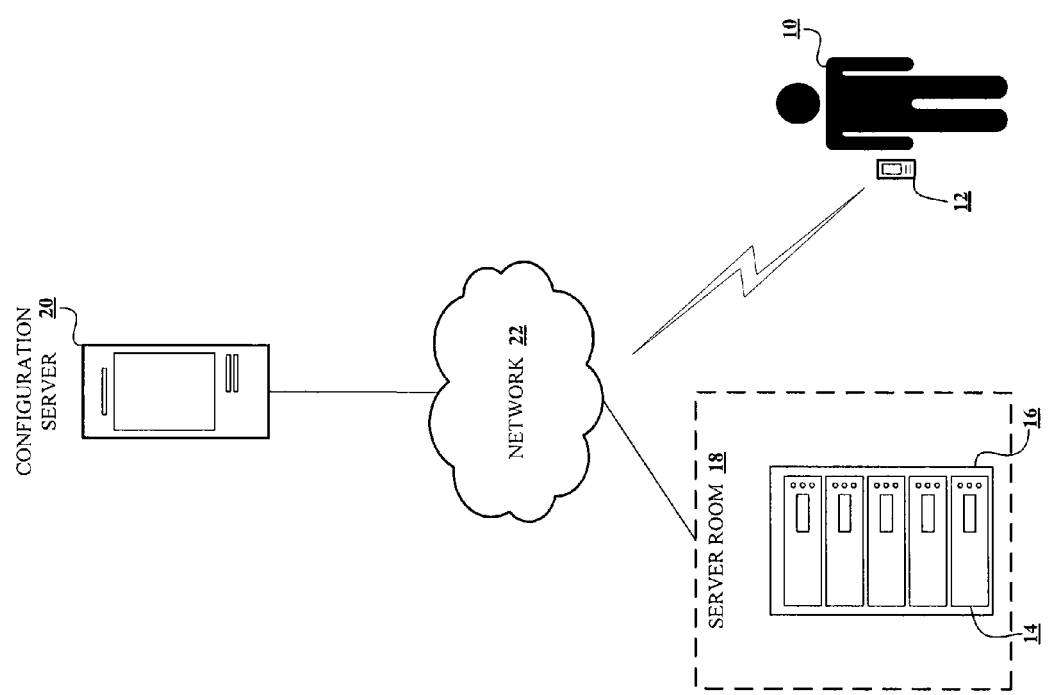

FIG. 1A illustrates an example of a computing environment in which an embodiment of the invention may be used. As illustrated in FIG. 1A, an administrator 10 has a mobile device 12—sometimes referred to herein as a mobile configurator—for automatically and securely configuring one or more computing devices. The mobile device 12 may be a mobile phone, a so-called smart phone, a personal digital assistant, a laptop or notebook computer, or any other like-kind device with wireless networking or communications capabilities. In one embodiment of the invention, the mobile device includes Bluetooth® wireless capabilities. However, it will be appreciated by those skilled in the art that various alternative wireless technologies might be used without departing from the spirit of the invention, to include: WiFi®, ZigBee®, infrared data association (IrDA), Wireless Universal Serial Bus (WUSB) or any other Ultra-wideband (UWB) technology, a proprietary wireless technology, or any other wireless technology enabling wireless personal area networks (WPANs).

In FIG. 1A, the particular computing devices to be configured are server appliances 14 stored in a server rack 16 located in a server room 18. Because server appliances are typically designed to operate without common peripherals such as keyboards and/or monitors, server appliances are one example of the type of computer device that may particularly benefit from the invention. However, it will be appreciated by those skilled in the art that any computing device that requires setup and configuration, particularly devices needing network configuration, may benefit from the invention.

In one embodiment of the invention, the configuration server 20 is maintained and hosted by a third party. For example, the configuration server 20 may be maintained and hosted by the manufacturer, seller, or distributor of the server appliances 14. Accordingly, as the server appliances are manufactured, information about the server appliances (e.g., serial numbers and configuration options) is communicated to the configuration server 20. In an alternative embodiment of the invention, the configuration server 20 may be maintained and hosted by the same entity that is maintaining the server appliances 14.

In operation, the administrator 10 first establishes a connection between the mobile device 12 and the configuration server 20 in order to provide the configuration server 20 with customer information and/or the unique computing device identifier of the target server appliance that is to be configured. For example, in one embodiment of the invention, each customer that purchases a server appliance is assigned a unique customer number and each server appliance is assigned a unique computing device identifier. To establish a communication session with the configuration server 20, the administrator must enter the proper customer number and/or server appliance unique computing device identifier, which are authenticated by the configuration server 20. As illustrated in FIG. 1A, the mobile device 12 has wireless communication capabilities. Accordingly, in FIG. 1A the mobile device 12 is shown to have established a wireless connection to the configuration server 20 via network 22.

The example computing environment illustrated in FIG. 1B is similar to that of FIG. 1A. However, in FIG. 1B, the administrator 10 accesses the configuration server 20 by means of a conventional computer 24. The computer 24 may be a desktop personal computer, a workstation, a laptop, a notebook, a tablet-based computer, or any similar device. In the example environment of FIG. 1B, the administrator interacts with the configuration server 20 via the computer 24. When the configuration file is received at the computer 24, the administrator must transfer the configuration file to the mobile device 12. This transfer may be accomplished over a wired or wireless connection between the mobile device 12 and the computer 24. For example, the transfer of the configuration file from the computer 24 to the mobile device 12 may occur over a universal serial bus (USB) connection, a WiFi® connection, a Bluetooth® connection, or any similar means.

Whether the administrator uses a computer 24 or a mobile device 12 to access the configuration server 20, in one embodiment of the invention the configuration server 20 includes a web server component (not shown) that enables conventional web-based interaction between the mobile device 12 or the computer 24 and the configuration server 20. For example, a web client application executes on the mobile device 12, or on the computer 24, and enables the user to send and receive data to the configuration server 20. Alternatively, a proprietary client application may reside and execute on either the computer 24 or the mobile device 12 and enable the administrator to interact with the configuration server 20. In one embodiment of the invention, the client application may use a secure (e.g., encryption) form of communication when communicating with the server, such as Secure Sockets Layer (SSL).

After the administrator 10 has established a connection with the configuration server 20 and provided a customer number and/or serial number of the target server appliance to be configured, the configuration server 20 may prompt the administrator 10 to enter one or more configuration parameters or settings. In one embodiment of the invention, the configuration server 20 may maintain a database of configuration options or parameters available to each server appliance, based on the server appliance's serial number. Accordingly, the configuration server 20 may prompt for the specific configuration parameters required for the server appliance associated with the serial number provided by the administrator. Furthermore, previously entered configuration information for one or more other computing devices associated with a customer number might be stored at the configuration server 20, or accessible to the configuration server 20. Consequently, the configuration server 20 may be able to suggest certain values for configuration parameters or provide a list of potential values for one or more configuration parameters. Under certain circumstances this may advantageously decrease the overall level of knowledge an administrator is required to have in order to configure a new server appliance.

The configuration parameters that are required may vary considerably depending upon the particular implementation. However, some common configuration parameters include: network settings such as Internet Protocol (IP) address(es), a gateway IP address, a domain name server IP address, security settings such as administrator authentication information (usernames and passwords or public keys), shared secrets such as personal identification numbers (PINs), etc.

In one embodiment of the invention, the configuration server 20 generates a configuration file including all of the required configuration parameters and settings required to setup and configure a target server appliance. In general, the configuration file will be in a format that is compatible with a configuration application executing on the target server appliance. Once generated, the configuration file is communicated—either directly, or via computer 24—to the mobile device 12. In one embodiment, multiple configuration files may be generated for multiple server appliances. In addition to one or more configuration files, in one embodiment of the invention a mobile configuration application is communicated from the configuration server 20 to the mobile device 12. The mobile configuration application, when executed on the mobile device 12 in the proximity of a target server appliance, causes the mobile device 12 to attempt to make a wireless connection with the target server appliance. Alternatively, the mobile device 12 may have a previously installed mobile configuration application, making it unnecessary to transfer the mobile configuration application from the configuration server 20 to the mobile device 12 along with the configuration file.

Figure 2:
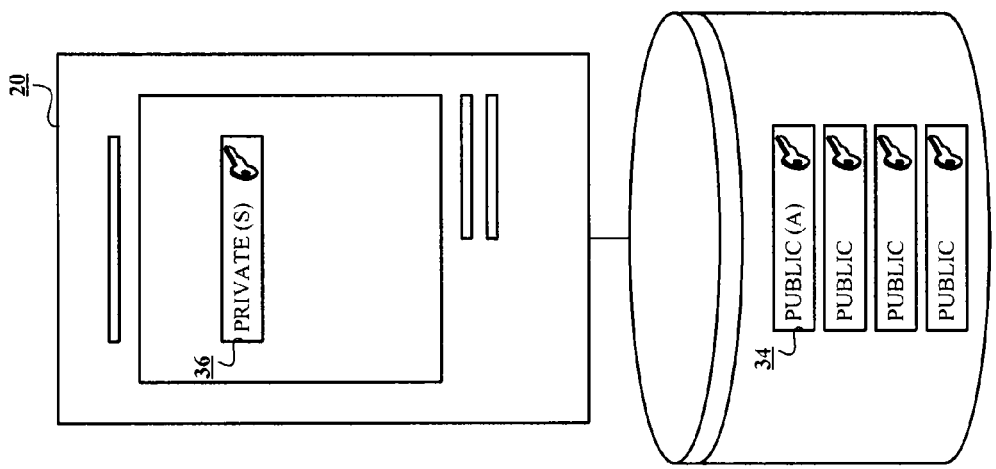
FIG. 2 illustrates a key generating service for generating and distributing keys, in accordance with an embodiment of the invention.
Figure 2:
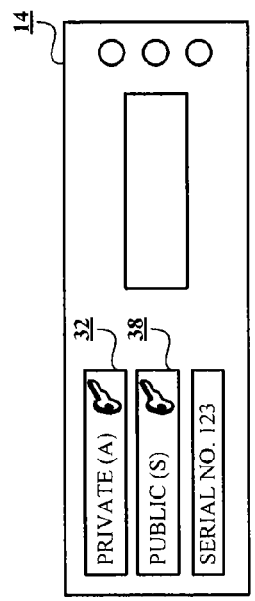

In one embodiment of the invention, public key cryptography is used to secure the configuration routine. Accordingly, FIG. 2 illustrates a target server appliance 14 and a configuration server 20 along with the various keys used during a configuration routine. Specifically, the target server appliance 14 has a key pair including a private key 32 (e.g., PRIVATE (A), where "A" is for Appliance), and a corresponding public key 34, "PUBLIC (A)" stored at the configuration server 20. The configuration server 20 includes a database of public keys—one public key for each target appliance 14. Similarly, the configuration server 20 has a key pair, including a private key 36, (e.g., "PRIVATE (S)"), and a corresponding public key 38 (e.g., "PUBLIC (S)"), which is shown to be stored at the target appliance server. It will be appreciated by those skilled in the art that there are a variety of conventional and well known methods for generating, distributing and securely storing such keys.

In operation, the pairs of keys are used by the configuration server 20 and the server appliance 14 to secure the configuration process. Accordingly, in one embodiment of the invention, after the configuration server 20 generates the configuration file, the configurations server 20 digitally signs the configuration file with the configuration server's private key 36. Consequently, when the configuration file is later transferred from the mobile device 12 to the server appliance 14, the server appliance 14 will be able to authenticate the configuration file by verifying, with the configuration server's public key 38, "PUBLIC (S)", that the digital signature associated with the configuration file was generated with the configuration server's private key 36. Similarly, after generating the configuration file, the configuration server 20 may encrypt the configuration file with the server appliance's public key 34, "PUBLIC (A)". Accordingly, when the configuration file is received at the server appliance 14, the server appliance 14 uses its private key 32, "PRIVATE (A)", to decrypt the configuration file, before reading the configuration settings.

Figure 3:
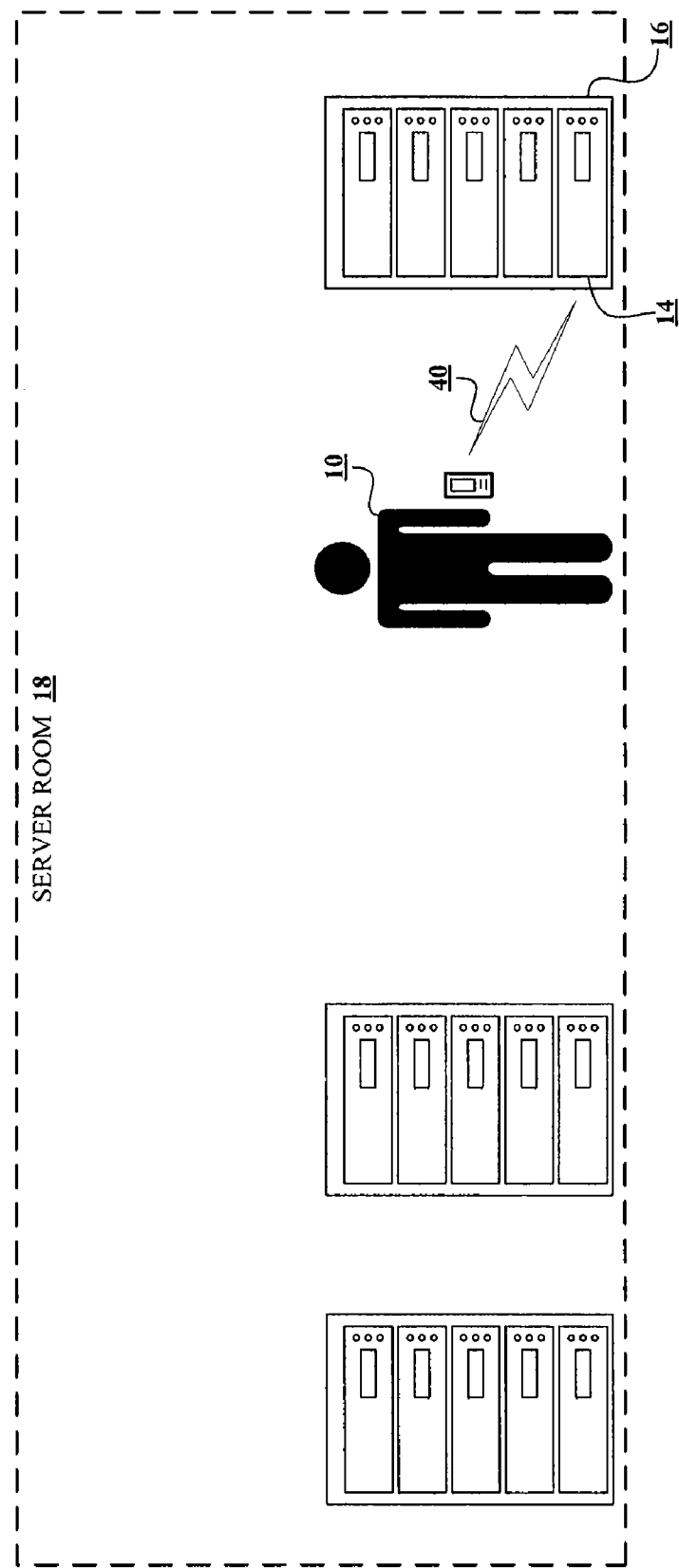
FIG. 3 illustrates an example of a computing environment including a target computing device requiring configuration, according to an embodiment of the invention.

Referring now to FIG. 3, once an administrator has gone through the process of generating and downloading a configuration file to the mobile device 12—directly or via computer 24, the mobile device 12 is ready to configure a target server appliance 14. Accordingly, the administrator 10 enters the proximity of the target server appliance 14, and executes a mobile configuration application on the mobile device 12. As briefly described above, the mobile configuration application may permanently reside on the mobile device, or alternatively, the mobile configuration application may be communicated from the configuration server 20 to the mobile device 12 with the configuration file. In FIG. 3, the administrator 10 is shown in a server room 18 with multiple server racks 16.

In one embodiment of the invention, executing the mobile configuration application on the mobile device causes the mobile configuration application to establish a wireless connection 40 with a target server appliance 14. For example, in one embodiment of the invention, the wireless connection may be a Bluetooth connection. In one embodiment of the invention, in order to allow the mobile device 12 to establish a connection, the target server appliance 14 may request a personal identification number (PIN), or other passcode.

In one embodiment of the invention, the target server is pre-configured to use its serial number, or a portion thereof, as a PIN or passcode. By using the serial number of the target server appliance as a PIN in a wireless protocol, an administrator can easily verify that he or she is attempting to establish a wireless connection with the proper target server appliance 14, particularly in the case when a server room has several target server appliances 14. For example, the PIN, just as its name suggests, aids the administrator in identifying the proper target server appliance 14. Accordingly, the administrator enters the appropriate PIN on the mobile device 12, which communicates the PIN to the target server appliance 14 for verification. Assuming the PIN is correct, the target server appliance 14 executes a configuration application. In one embodiment of the invention, the target server appliance 14 is configured to execute the configuration application upon establishing a wireless connection with a mobile device only if the target server appliance 14 has not been previously configured.

Once the connection is established, and the target server appliance 14 has executed its configuration application, the target server appliance 14 communicates its serial number to the mobile device 12. The mobile device 12 then verifies the serial number by comparing it with serial numbers associated with any configuration files stored on the mobile device 12. If the mobile device 12 has a configuration file with a serial number matching that of the target server appliance 14, the mobile device 12 transfers the configuration file to the target server appliance 14, and the configuration application executing on the target server appliance 14 begins the self-configuration process.

As described briefly above, the configuration file may be digitally signed and encrypted when received at the target server appliance 14. Accordingly, in one embodiment of the invention, once the target server appliance 14 receives the configuration file, it decrypts the configuration file with its private key 32, and then validates the digital signature of the configuration file with the configuration server's public key 38 before reading configuration parameters from the file. In various embodiments of the invention, additional security measures may be implemented. For example, in one embodiment of the invention, after the target server appliance 14 decrypts the configuration file and validates its digital signature, the target server appliance 14 generates a digital signature of the configuration file utilizing the target server appliance's private key. The target server appliance 14 then sends the digital signature and its public key to the mobile device 12, and waits for an indication from the administrator that is it is safe to proceed with the configuration process. In turn, the mobile device 12 validates the public key and digital signature received from the server appliance 14. For example, the mobile device 12 may compare a "fingerprint" (e.g., a one way hash) generated from the public key received from the server appliance with a fingerprint received from the configuration server. In addition, the mobile device 12 validates the digital signature received from the target server appliance 14. Assuming both the public key "fingerprint" and digital signature can be validated, the mobile device 12 instructs the administrator to indicate to the target server appliance 14 that it is safe to proceed with the configuration process. For example, in one embodiment of the invention, the mobile device 12 may instruct the administrator to press a user interface object, such as a button on the face of the target server appliance 14. Accordingly, the target server appliance's configuration application continuously monitors the state of the user interface object (e.g., the button), and when the user interface object is selected or pressed, the configuration application proceeds with the configuration operation.

In one embodiment of the invention, during the initial configuration process, the configuration application executing on the target server appliance 14 modifies the PIN or passcode used by the mobile device 12 to establish the wireless connection with the server appliance 14. For example, in one embodiment of the invention, the configuration application executing on the server appliance 14 uses a secret included in the configuration file received from the configuration server 20 and the serial number, or a portion thereof, to generate a new secret PIN or passcode. For instance, the new PIN may be generated by generating a hash from the secret and the server appliance's serial number. Accordingly, to establish a connection with the server appliance 14 after the initial configuration occurs, an administrator enters the secret and the serial number of the target server appliance 14 into a management application executing on the mobile device 12, which generates the necessary PIN in order to connect wirelessly to the target server appliance 14. Because the new secret PIN or passcode is generated based on a secret contained in the configuration file, the new secret PIN or passcode can be used for authentication purposes when establishing a connection with the target server appliance 14.

Figure 4:
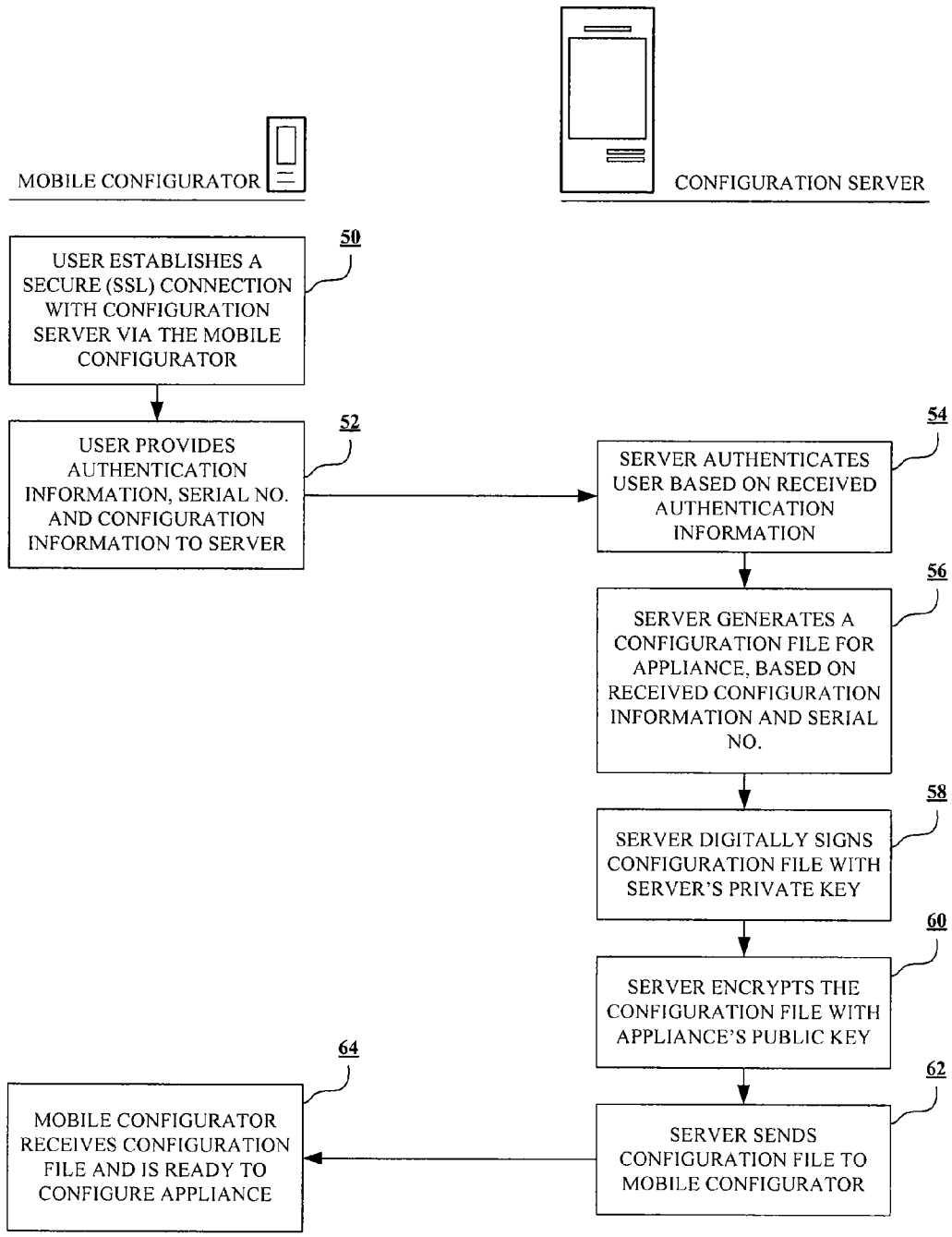
FIGS. 4 and 5 illustrate a method, according to an embodiment of the invention, for configuring a computing device with a wireless mobile device.
Figure 5:
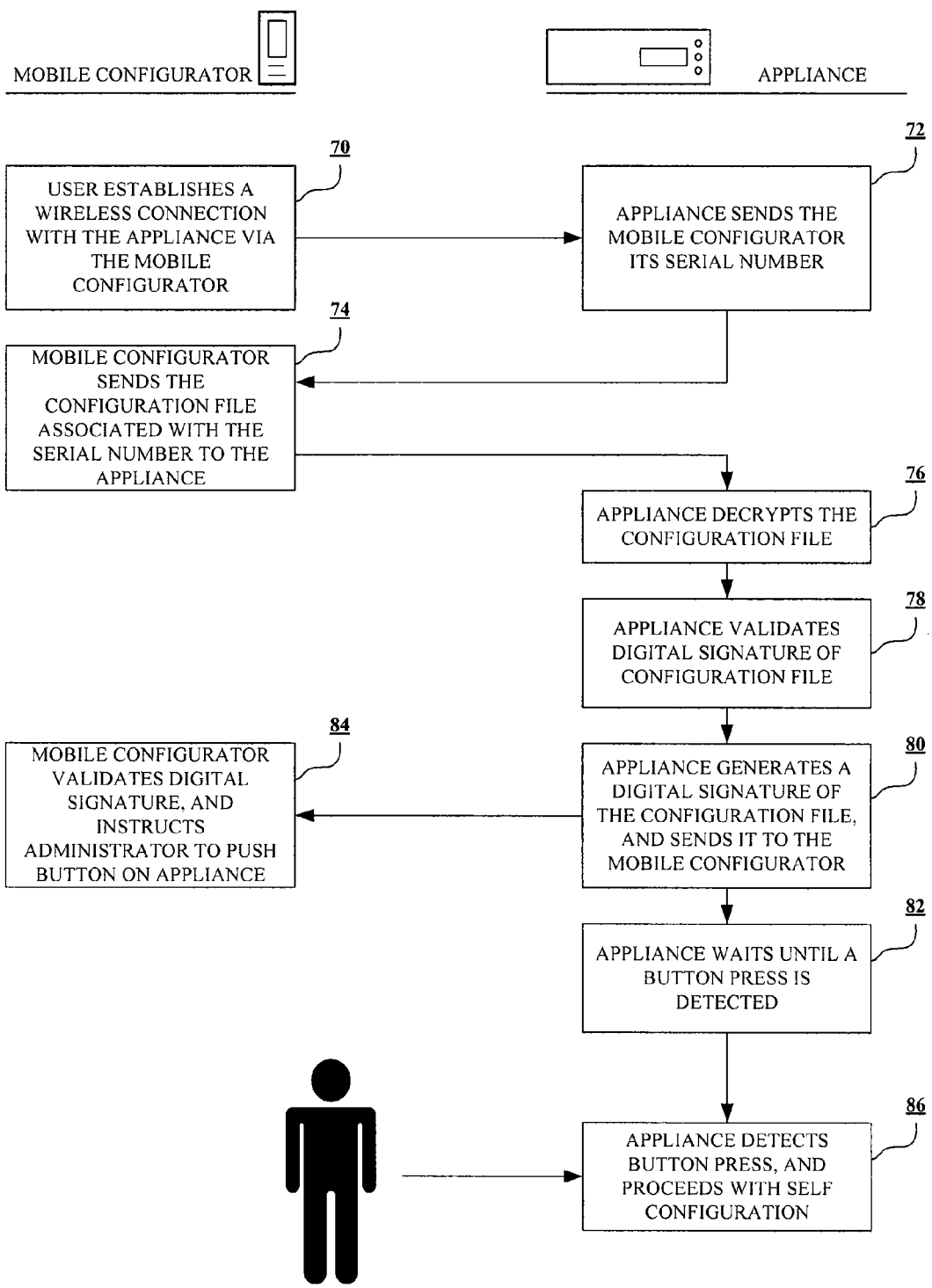

FIGS. 4 and 5 illustrate a method, consistent with one embodiment of the invention, for utilizing a mobile configurator to configure a computing device. At operation 50, an administrator causes a mobile configurator 12 to establish a secure communications session with a configuration server 20 over a network. The configuration server 20, at operation 52, prompts the administrator to enter authentication information, which is authenticated by the configuration server 20 at operation 54. For example, the administrator may be prompted to enter a customer number and/or a serial number associated with the target server appliance 14—that is, the appliance 14 to be configured. In addition, the configuration server 20 may prompt the administrator to enter, or select, one or more configuration values or settings for the target server appliance 14. Although the operation is illustrated in FIG. 4 as a single operation, those skilled in the art will appreciate that the actual flow of data between the mobile configurator 12 and the configuration server 20 will be implementation dependent. For example, in one embodiment, the configuration server 20 may execute a configuration wizard that walks the administrator through several prompts or web pages where different configuration information can be entered or selected. Accordingly, the mobile configurator 12 and the configuration server 20 may exchange data several times.

At operation 56, the configuration server 20 generates a configuration file for the appliance associated with the serial number entered by the administrator. Next, at operation 58, the configuration file is digitally signed with a private key of the configuration server 20. Accordingly, the target server appliance 14 can authenticate the configuration file with a public key of the configuration server 20. Then, at operation 60 the configuration file is encrypted with a public key of the target server appliance 14. Accordingly, the target appliance 14 can use its private key to decrypt the configuration file. At operation 62, the configuration server 20 sends the configuration file to the mobile configurator 12. In one embodiment of the invention, the configuration server 20 may also send a mobile configuration application that is specifically generated to execute on a particular mobile configurator 12. For example, the configuration server 20 may be configured to generate a variety of different mobile configurator applications for different mobile configurator platforms. In any case, once the mobile configurator has received a configuration file from the configuration server for the target server appliance 14, the mobile configurator is ready to configure the target server appliance 14.

Referring now to FIG. 5, at operation 70, while the administrator is in relatively close proximity (e.g., within wireless range) to the target server appliance 14, the administrator executes the mobile configuration application on the mobile configurator 12. The mobile configuration application causes the mobile configurator 12 to establish a wireless connection with the target server appliance 14. In one embodiment of the invention, the mobile configuration application may prompt the user to select one server appliance (e.g., the target) from a group of available server appliances. In any case, at operation 72, upon establishing a wireless connection with the target server appliance 14, the target server appliance 14 sends the mobile configurator 12 its serial number. Accordingly, the mobile configurator checks the serial number against available configuration files, and if the serial number matches a serial number associated with a particular configuration file, the mobile configurator sends the configuration file to the target server appliance 14 at operation 74.

Upon receiving the configuration file, at operation 76, the target server appliance 14 uses its private key 32 to decrypt the contents of the configuration file. Next, at operation 78, the server appliance 14 uses a public key 38 of the configuration server 20 to validate the digital signature of the configuration file. It will be appreciated by those skilled in the art that the order of operations 76 and 78 depend upon the order in which the configuration server digitally signs and encrypts the configuration file. Accordingly, operations 76 and 78 might occur in reverse order without departing from the spirit of the invention, if the configuration server encrypts the configuration file before digitally signing the configuration file.

In any case, in one embodiment of the invention, after validating the digital signature of the configuration file, at operation 80 the server appliance 14 generates a digital signature of the configuration file with its private key, and sends the digital signature to the mobile configurator along with a public key 38. At this point (e.g., operation 82) the target server appliance 14 is ready to execute a configuration routine and simply waits until it detects the press of a button indicating that it should begin the self-configuration routine. At operation 84, the mobile configurator validates the digital signature of the configuration file received from the target server appliance 14. If the digital signature is properly validated, and the public key's "fingerprint" is properly validated, the mobile configuration application notifies the administrator that everything is in order and the button on the server appliance 14 can be pressed to begin the configuration. At operation 86, upon detecting the press of the button, the target server appliance 14 begins the self configuration routine. Accordingly, the target server appliance 14 will extract any necessary configuration parameters and settings from the configuration file and apply them as necessary.

In one embodiment of the invention, during the self configuration routine, the target server appliance 14 generates a new PIN or passcode required to establish a wireless connection with the server appliance 14. For example, in one embodiment, the new PIN is generated based on the server appliance's serial number and a secret code generated by the configuration server and included in the configuration file. The mobile configurator 12 may include a PIN generator such that an administrator can enter a server appliance's serial number and the secret code, and the mobile configurator will generate the appropriate PIN for the server appliance. Consequently, subsequent to the initial configuration of the server appliance, a separate management application executing on the mobile configurator may be used to manage or administer aspects of the server appliance via a wireless connection to a management application executing on the server appliance.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as a set of instructions stored on a computer-readable medium. The scope of the invention is defined by the claims and their equivalents.

The invention claimed is:

1. A computer-implemented method for configuring a computing device with a mobile configurator, comprising:
   after receiving a configuration file from a configuration server, establishing a wireless communication session with the computing device;
   sending the configuration file to the computing device so as to enable a configuration application executing on the computing device to configure the computing device in accordance with configuration information included in the configuration file;
   after sending the configuration file to the computing device, receiving a computing device generated digital signature of the configuration file from the computing device; and
   at the mobile configurator, prompting a user to press a button on the computing device to initiate a self configuration process on the computing device if the computing device generated digital signature of the configuration file received from the computing device is properly validated.

2. The method of claim 1 further comprising:
   after establishing the wireless communication session with the computing device, receiving, from the computing device, a unique identifier associated with the computing device; and
   selecting a configuration file associated with the unique identifier to send to the computing device.

3. The method of claim 2, wherein the configuration server associates the unique identifier with the computing device when the configuration file is initially generated at the configuration server.

4. The method of claim 3, wherein the unique identifier is a serial number of the computing device, a portion of the serial number of the computing device, or a Media Access Control (MAC) address from a network interface card (NIC) included with the computing device.

5. The method of claim 1, wherein the configuration file is generated at the configuration server, in part, with configuration information from a previously configured computing device associated with the computing device to be configured, and in part, with configuration information provided to the configuration server by the user.

6. The method of claim 1, wherein the configuration file is digitally signed at the configuration server with a private key of the configuration server to generate a configuration server generated digital signature associated with the configuration file, and upon receiving the configuration file, the computing device authenticates the configuration server generated digital signature associated with the configuration file with a public key of the configuration server.

7. The method of claim 1, wherein the configuration file is encrypted at the configuration server with a public key of the computing device, and upon receiving the configuration file, the computing device decrypts the configuration file with a private key of the computing device.

8. The method of claim 1, wherein the wireless communication session is a Bluetooth communication session, and said establishing a wireless communication session with the computing device further comprises:
prompting the user to enter a passcode, and
sending the user-entered passcode to the computing device for verification, wherein the computing device authorizes the wireless communication session if the user-entered passcode matches a predetermined passcode stored at the computing device.

9. At a computing device, a computer-implemented method, comprising:
receiving a configuration file from a wireless mobile configurator over a wireless communication channel, the configuration file generated at a configuration server;
authenticating the configuration file by validating a configuration server generated digital signature associated with the configuration file. the configuration server generated digital signature generated with a private key of the configuration server;
decrypting the configuration file with a private key of the computing device, the configuration file encrypted at the configuration server with a public key of the computing device;
extracting configuration information from the configuration file to use with a configuration process executing on the computing device, the configuration process to automatically configure the computing device in accordance with the configuration information;
generating a computing device generated digital signature of the configuration file and sending the computing device generated digital signature of the configuration file to the wireless mobile configurator; and
monitoring a user interface object to detect user input, wherein the wireless mobile configurator is to validate the computing device generated digital signature and prompt a user to activate the configuration process by interacting with the user interface object.

10. The method of claim 9, further comprising:
prior to receiving the configuration file from the wireless mobile configurator, sending the wireless mobile configurator a unique identifier associated with the computing device so as to enable the wireless mobile configurator to select a configuration file associated with the unique identifier for the computing device.

11. The method of claim 9 further comprising:
prior to receiving the configuration file, receiving a request to establish a wireless communication session over the wireless communication channel from the wireless mobile configurator and prompting the wireless mobile configurator for a passcode;
receiving the passcode from the wireless mobile configurator; and
establishing the wireless communication session with the wireless mobile configurator if the passcode matches a predetermined passcode stored at the computing device.

12. The method of claim 11, further comprising:
extracting a code from the configuration file; and
generating a new passcode for authenticating wireless connection requests, wherein the new passcode is based on the code extracted from the configuration file and a unique identifier associated with the computing device.

13. A wireless mobile configurator, comprising:
a wireless communication module configured to establish a wireless connection with a computing device and to send a configuration file to the computing device, wherein the configuration file i) is generated at, and received from, a configuration server, and ii) is associated with a unique identifier of the computing device; and
authentication logic configured to authenticate a digital signature of the configuration file received from the computing device, wherein, if the digital signature is authentic, the authentication logic is configured to prompt a user to activate a configuration process on the computing device by interacting with a user interface object of the computing device.

14. The wireless mobile configurator of claim 13, wherein the configuration file is encrypted and digitally signed when generated at the configuration server.

15. The wireless mobile configurator of claim 13, further comprising: configuration file selection logic configured to select a configuration file associated with the unique identifier of the computing device to send to the computing device.

* * * * *